(12) United States Patent
Przybyla et al.

(10) Patent No.: US 8,039,550 B2
(45) Date of Patent: Oct. 18, 2011

(54) PROCESS FOR PREPARING A POLYMER DISPERSION AND A POLYMER DISPERSION

(75) Inventors: Christian Przybyla, Duisburg (DE); Oliver Struck, Düren (DE); André Laschewsky, Potsdam (DE); Bernd Paulke, Potsdam (DE); Mathias Hahn, Michendorf OT Wilhelmshorst (DE)

(73) Assignees: Akzo Nobel N.V., Arnhem (NL); Fraunhofer-Gesellschaft zur Forderung der angewandten Forschung E.V., Munich (DE)

( * ) Notice: Subject to any disclaimer, the term of this patent is extended or adjusted under 35 U.S.C. 154(b) by 0 days.

(21) Appl. No.: 11/437,044

(22) Filed: May 19, 2006

(65) Prior Publication Data

US 2006/0281858 A1    Dec. 14, 2006

Related U.S. Application Data

(60) Provisional application No. 60/683,248, filed on May 20, 2005.

(51) Int. Cl.
| | |
|---|---|
| C08F 220/06 | (2006.01) |
| C08F 220/04 | (2006.01) |
| C08F 220/34 | (2006.01) |
| C08F 2/16 | (2006.01) |
| C08L 33/02 | (2006.01) |
| C08K 3/00 | (2006.01) |

(52) U.S. Cl. ........ 524/832; 524/401; 524/800; 524/804; 524/816; 524/817

(58) Field of Classification Search .......... 524/401, 524/800, 804, 832, 816, 817, 845
See application file for complete search history.

(56) References Cited

U.S. PATENT DOCUMENTS

| | | | | |
|---|---|---|---|---|
| 5,605,970 | A | 2/1997 | Selvarajan | 525/274 |
| 5,837,776 | A * | 11/1998 | Selvarajan et al. | 525/244 |
| 5,889,101 | A * | 3/1999 | Schlarb et al. | 524/460 |
| 5,985,992 | A | 11/1999 | Chen | 524/814 |
| 6,245,838 | B1 | 6/2001 | Bogaert et al. | 524/48 |
| 6,265,477 | B1 | 7/2001 | Hurlock | 524/458 |
| 6,432,271 | B1 * | 8/2002 | Wong Shing et al. | 162/168.3 |
| 7,034,068 | B1 * | 4/2006 | Negele et al. | 524/45 |

FOREIGN PATENT DOCUMENTS

| | | |
|---|---|---|
| CA | 2066988 A1 | 10/1992 |
| EP | 0 637 598 B1 | 2/1995 |
| EP | 0 717 056 A2 | 6/1996 |
| EP | 0 717 056 A3 | 6/1996 |
| JP | 2001-254290 | 9/2001 |
| JP | 2003-119696 | 4/2003 |
| JP | 2003-155691 | 5/2003 |
| JP | 2003-253593 | 9/2003 |
| JP | 2004-059748 | 2/2004 |
| WO | WO 97/32904 A1 | 9/1997 |
| WO | WO 97/34933 A1 | 9/1997 |
| WO | WO 99/29745 A1 | 6/1999 |
| WO | WO 00/11052 A1 | 3/2000 |
| WO | WO 00/11053 A1 | 3/2000 |
| WO | WO 01/18063 A1 | 3/2001 |
| WO | WO 01/18064 A1 | 3/2001 |
| WO | WO 03/050354 A1 | 6/2003 |
| WO | WO 03/097703 A1 | 11/2003 |
| WO | WO 2005/035872 A1 | 4/2005 |

OTHER PUBLICATIONS

Patent Abstracts of Japan Translation of JP 2001-254290.
Patent Abstracts of Japan Translation of JP 2003-119696.
Patent Abstracts of Japan Translation of JP 2003-155691.
Patent Abstracts of Japan Translation of JP 2003-253593.
Patent Abstracts of Japan Translation of JP 2004-059748.

* cited by examiner

Primary Examiner — Karuna P Reddy
(74) Attorney, Agent, or Firm — Robert C. Morriss

(57) ABSTRACT

The present invention relates to a process for preparing a polymer dispersion comprising polymerising one or more water soluble anionic monomers ($m_1$) and one or more non-ionic vinyl monomers ($m_2$) present in a reaction mixture further comprising a polymeric stabiliser (B) and a polymeric co-stabiliser (C). It further relates to a polymer dispersion, the use of the polymer dispersion and a process for producing paper.

24 Claims, No Drawings

PROCESS FOR PREPARING A POLYMER DISPERSION AND A POLYMER DISPERSION

This application claims priority based on U.S. Provisional Patent Application No. 60/683,248, filed May 20, 2005.

The present invention relates to a process for preparing a polymer dispersion. It also relates to a polymer dispersion, the use of the polymer dispersion and a process for producing paper.

BACKGROUND OF THE INVENTION

An important use of aqueous dispersions of anionic charged polymers is retention and dewatering aid in paper manufacturing industry. Further uses of such polymer dispersions are as aids in various processes where they act as, for example, flocculants when treating wastewater or aids in other solid-liquid separation processes in, for example, the metal, ceramic, printing, biotechnological, and pharmaceutical industries. They can also be used as thickeners in, e.g., chemical, biotechnological, pharmaceutical, and cosmetic industries and soil improving agents. Generally, these polymer dispersions comprise a dispersed polymer and a dispersant in which the dispersant usually is a polymeric dispersant.

Anionic polymer dispersions are generally prepared by polymerising a reaction mixture of water-soluble anionic and non-ionic monomers in the presence of a salt. Finished polymer will precipitate from the aqueous salt solution and, by using a suitable dispersant, form a stable polymer dispersion. WO 01/18063, U.S. Pat. Nos. 5,837,776 and 5,605,970 disclose processes for preparing a dispersion of a water-soluble polymer comprising polymerising water-soluble monomers in an aqueous reaction mixture containing a salt.

Factors to consider are, for example, the process viscosity, active content, stability, good retention properties, and easiness of preparing the polymer dispersion sometimes including preparing the stabiliser. Also, criteria such as environmental and safety aspects are of importance.

There are a number of criteria that the polymer dispersion should fulfill to give good results in the final application and be of commercial interest. Such criteria are for example low-cost production, rapid performance, effective flocculation or dewatering, and long shelf life.

Prior art anionic polymer dispersions described contain significant amounts of salt which makes up a great part of the weight of the polymer dispersion. There is presently a desire to reduce, or completely avoid, the use of salt in polymer dispersions due to environmental and economical reasons.

The viscosity of the reaction mixture when producing the polymer dispersion, "the process viscosity", should be kept low and viscosity peaks should be avoided, or at least reduced as much as possible, during the production of the polymer dispersion.

The shelf life of the dispersion, i.e., the stability of the polymer dispersion over time, is an important property. An efficient dispersant is needed for keeping the polymer particles stable in dispersion without settling as sediment.

A further factor to consider is the active content, i.e., the amount of dispersed polymer in the polymer dispersion. A high active content minimises transportation costs and gives easier handling at the end-application. By using an efficient dispersant, dispersions with a high active content can be obtained at the same time the viscosity can be kept low. However, an increase of the active content above a certain level may not always give improved performance in retention and dewatering in a papermaking process.

During preparation of a polymer dispersion, deposits of polymer may form and stick to the reaction vessel and stirrer. This leads to time consuming cleaning procedures of the reaction equipment.

It is an object of the present invention to provide a, preferably salt-free, water soluble anionic polymer dispersion having high stability and high active content. The polymer dispersion should also give good retention and dewatering results when used in papermaking processes, act as a good flocculant in other processes such as waste water treatment, act as a good thickener in various applications such as cosmetic formulations and also be possible to use in soil improvement processes. It is further an object of the present invention to provide a process for preparing a, preferably salt-free, water soluble anionic polymer dispersion in which the process viscosity is kept low and smooth during preparation without any large viscosity peaks, and which gives no deposits. Finally, it is an object of the present invention to provide a process for producing paper in which the polymer dispersion is used.

THE INVENTION

By "stabiliser" is herein meant a polymer which function is to keep dispersed polymer particles/droplets in dispersion.

By "co-stabiliser" is herein meant a polymer which function is to make a polymer formed from polymerisation of one or more monomers to precipitate out from solution into solid particles or liquid droplets.

According to the invention it has surprisingly been found that a highly stable polymer dispersion having high active content of a dispersed polymer and low process viscosity can be achieved by a process for preparing a polymer dispersion comprising polymerising one or more anionic monomers ($m_1$) and one or more non-ionic vinyl monomers ($m_2$) present in a reaction mixture further comprising a polymeric stabiliser (B) and a polymeric co-stabilisers (C).

The invention further comprises a polymer dispersion comprising a dispersed polymer (A) of one or more anionic monomers ($m_1$) and one or more non-ionic vinyl monomers ($m_2$), a polymeric stabiliser (B), and a polymeric co-stabiliser (C).

The reaction medium is suitably an aqueous medium. The polymer dispersion is suitably an aqueous polymer dispersion. The polymer dispersion is suitably water-soluble. The polymer particles/droplets suitably has an average size (thickness) of up to about 25 µm, also suitably from about 0.01 to about 25 µm, preferably from about 0.05 to about 15 µm, most preferably from about 0.2 to about 10 µm.

The polymeric stabiliser (B) is suitably an organic polymer. Preferably the polymeric stabiliser (B) is a polymer of one or more monomers belonging to the group of acrylic acid, methacrylic acid, itaconic acid, 2-acrylamido-2-methyl-1-propane sulphonic acid (AMPS), 2-acrylamido-2-methyl-1-butane sulphonic acid (AMBS), acryloyloxyethyl sulphonic acid, methacryloyloxyethyl sulphonic acid, acryloyloxypropyl sulphonic acid, methacryloyloxypropyl sulphonic acid, vinyl sulphonic acid, allyl sulphonic acid, methallyl sulphonic acid, styrene sulphonic acid, maleic acid, maleamidic acid, and/or vinyl phosphonic acid. Other suitable polymeric stabilizers are copolymers of maleic acid or maleamidic acid, respectively, with styrene or vinyl ethers, or alpha-olefins which may contain additional comonomers. Preferably, the polymeric stabiliser (B) is a copolymer of acrylic acid or methacrylic acid with a further of the listed monomers, preferably 2-acrylamido-2-methyl-1-propane sulphonic acid (AMPS).

The weight average molecular weight of the polymeric stabiliser (B) is suitably from about 5,000 to about 5,000,000 g/mole, preferably from about 10,000 to about 1,000,000 g/mole, more preferably from about 20,000 to about 1,000,000 g/mole, most preferably from about 35,000 to about 500,000 g/mole.

The polymer dispersion suitably comprises from about 0.2 to about 5 weight % of the polymeric stabiliser (B) based on the total weight of the dispersion or reaction mixture, preferably from about 0.5 to about 3 weight %, most preferably from about 0.8 to about 1.5 weight %.

The polymeric co-stabiliser (C) is suitably an organic polymer. Preferably, the polymeric co-stabiliser (C) is a polymer of one or more monomers belonging to the group of acrylic acid, methacrylic acid, vinyl sulphonate, styrene sulphonic acid, itaconic acid, vinylphosphonic acid, 2-acrylamido-2-methyl-1-propane sulphonic acid (AMPS), 2-acrylamido-2-methyl-1-butane sulphonic acid (AMBS), acryloyloxyethyl sulphonic acid, methacryloyloxyethyl sulphonic acid, acryloyloxypropyl sulphonic acid, and methacryloyloxypropyl sulphonic acid.

Preferably, two or more co-stabilisers (C) are present in the reaction mixture and polymer dispersion.

The weight average molecular weight of the polymeric co-stabiliser (C) is suitably from about 100 to about 50,000 g/mol, preferably from about 500 to about 30,000 g/mol, more preferably from about 1,000 to about 20,000 g/mol, even more preferably from about 1,000 to about 15,000 g/mol, most preferably from about 1,000 to about 10,000 g/mol.

The polymer dispersion suitably comprises from about 2 to about 50 weight % of one or more polymeric co-stabilisers (C) based on the total weight of the dispersion or reaction mixture, preferably from about 3 to about 25 weight %, most preferably from about 5 to about 15 weight %.

The polymeric stabiliser (B) and the polymeric co-stabiliser (C) in the reaction mixture or polymer dispersion are preferably made up from different monomers or, if they are made up from the same monomers, contain different monomer ratios.

The polymeric stabiliser (B) or polymeric co-stabiliser (C) is suitably not a dextrin or dextrin derivative.

The one or more anionic monomers ($m_1$) suitably belong to the group of acrylic acid, methacrylic acid, (styrene sulphonic acid), 2-acrylamido-2-methyl-1-propane sulphonic acid (AMPS), 2-acrylamido-2-methyl-1-butane sulphonic acid (AMBS), acryloyloxyethyl sulphonic acid, methacryloyloxyethyl sulphonic acid, acryloyloxypropyl sulphonic acid, methacryloyloxypropyl sulphonic acid, vinyl sulphonic acid, and their alkali, earth alkali or ammonium salts.

The one or more non-ionic monomers ($m_2$) suitably belong to the group of acrylamide, methacrylamide, N-methylacrylamide, N-methylmethacrylamide, N-ethylacrylamide, N-ethylmethacrylamide, N-isopropylacrylamide, N-isopropylmethacrylamide, N,N-dimethylacrylamide, N-t-butylacrylamide, N-t-butylmethacrylamide, N-hydroxyethylacrylamide, N-(tris-(hydroxymethyl)-methyl)-acrylamide, N-vinyl formamide, N-vinyl acetamide, hydroxyalkylacrylate or hydroxyalkylmethacrylate with C2-C4 alkyl, alkylacrylate or alkylmethacrylate with C1-C4 alkyl, benzylacrylate or benzylmethacrylate, esters of acrylic or methacrylic acid with dihydroxy-(polyethylene oxide) having 1-20 ethylene oxide units, or esters of acrylic or methacrylic acid with monomethoxyhydroxy-(polyethylene oxide) having 1-20 ethylene oxide units. Preferably, the one or more non-ionic monomers ($m_2$) belong to the group of acrylamide, acrylate or methacrylate esters.

The molar ratio between the anionic monomer ($m_1$) and the non-ionic monomer ($m_2$) is suitably from about 1:99 to about 25:75, preferably from about 3:97 to about 20:80, most preferably from about 5:95 to about 15:85.

The weight average molecular weight of the dispersed polymer (A) is suitably from about 1,000,000 to about 15,000,000 g/mole, preferably from about 1,500,000 to about 10,000,000 g/mole, most preferably from about 2,000,000 to about 8,000,000 g/mole.

The polymerisation is suitably a free-radical polymerisation. The initiator is suitably a radical former, preferably a water-soluble azo-initiator, a water-soluble peroxide, or a water-soluble redox initiator. Preferred initiators include 2,2'-azobis-(amidinpropane) hydrochloride, 2,2'-azobis-(2-methyl-N-(2-hydroxyethyl)-propionamide, 4,4'-azobis-(4-cyanovaleric acid) and its alkali and ammonium salts, t-butylhydroperoxide, perhydrol, peroxydisulphate, or the before mentioned peroxides in combination with a reducing agent such as sodium metabisulphite or ferrous salts.

The polymer dispersion suitably comprises from about 5 to about 40 weight % of the dispersed polymer (A) based on the total weight of the dispersion, preferably from about 10 to about 30 weight %, most preferably from about 12 to about 25 weight %.

The amount of one or more inorganic salts in the polymer dispersion is suitably from 0 to about 1.9 weight % based on the total weight of the dispersion or reaction mixture, preferably from 0 to about 1 weight %, more preferably from 0 to about 0.5 weight %, most preferably from 0 to about 0.1 weight %, or substantially salt-free.

By "inorganic salts" is herein suitably meant any inorganic salt, preferably salts belonging to the group of inorganic alkali metal, alkali earth metal or ammonium halides, sulphates and phosphates.

The polymer dispersion may also comprise additional substances, such as cross-linkers and branching agents.

The polymerisation temperature when may vary depending on, e.g., which monomers and polymerisation initiator are being used. Suitably, the polymerisation temperature is from about 30 to about 90° C., preferably from about 35 to about 70° C. The process is suitably a semi-batch process, i.e., the monomers $m_1$ and $m_2$ are both present at the beginning of the polymerisation process and further added at a later stage, either in one or more portions or continuously over a period of time during the reaction. The reaction mixture is suitably stirred during the polymerisation process at a stirring rate suitable for the process. Suitably, the stirring rate is from about 100 to about 1000 rpm.

The invention further comprises use of a polymer dispersion as retention and dewatering aid for paper manufacturing, as thickening agent, as soil improvement agent and/or as an additive for increasing the dry strength of paper. The polymer dispersion of the present invention can more specifically be used as aid in various processes as, for example, flocculants when treating wastewater or aids in other solid-liquid separation processes in, for example, the metal, ceramic, printing, biotechnological, and pharmaceutical industries. The polymer dispersion can also be used as thickener in, e.g., chemical, biotechnological, pharmaceutical, and cosmetic industries.

Finally, the present invention comprises a process for the production of paper from an aqueous suspension containing cellulosic fibres, and optional fillers, which comprises adding to the suspension an aqueous polymer dispersion according to the invention, forming and draining the suspension on a wire.

When using the polymer dispersion, according to the invention, in papermaking processes, the dispersion is added to the suspension of cellulosic fibres, and optional fillers, to be dewatered in amounts which can vary within wide limits depending on, inter alia, type and number of components, type of furnish, filler content, type of filler, point of addition, etc. The dispersed polymer is usually added in an amount of at least 0.001%, often at least 0.005% by weight, based on dry substance in the stock to be dewatered, and the upper limit is usually 3% and suitably 1.5% by weight. The polymer dispersion according to the invention is suitably diluted before adding it to the cellulosic suspension. Further additives which are conventional in papermaking can of course be used in combination with the polymer dispersion according to the invention, such as, for example, silica-based sols, dry strength agents, wet strength agents, optical brightening agents, dyes, sizing agents like rosin-based sizing agents and cellulose-reactive sizing agents, e.g. alkyl and alkenyl ketene dimers, alkyl and alkenyl ketene multimers, and succinic anhydrides, etc. The cellulosic suspension, or stock, can also contain mineral fillers of conventional types such as, for example, kaolin, china clay, titanium dioxide, gypsum, talc and natural and synthetic calcium carbonates such as chalk, ground marble and precipitated calcium carbonate. The term "paper", as used herein, include not only paper and the production thereof, but also other cellulosic fibre-containing sheet or web-like products, such as for example board and paperboard, and the production thereof. The process can be used in the production of paper from different types of suspensions of cellulose-containing fibres and the suspensions should suitably contain at least 25% by weight and preferably at least 50% by weight of such fibres, based on dry substance. The suspension can be based on fibres from chemical pulp such as sulphate, sulphite and organosolv pulps, mechanical pulp such as thermomechanical pulp, chemo-thermomechanical pulp, refiner pulp and groundwood pulp, from both hardwood and softwood, and can also be based on recycled fibres, optionally from de-inked pulps, and mixtures thereof.

The invention will now further be described in connection with the following examples which, however, not should be interpreted as limiting the scope of the invention.

EXAMPLES

Example 1

A stabiliser made of methacrylic acid (MAA) and 2-acrylamido-2-methyl-1-propane sulphonic acid (AMPS) in a mole ratio of 80:20 was prepared: A mixture of 85 g ultra-pure water, 8.24 g AMPS (solid), 16.62 g MAA and 11.5 g NaOH (50%) was adjusted to pH 7 by means of NaOH (50%). 0.02 g EDTA (solid) was given into the mixture. Further ultra-pure water was added to reach a total mass of 127 g. This was filled into a double-wall 150 ml glass reactor with anchor stirrer, nitrogen inlet, reflux condenser and bottom valve. The mixture was stirred with 150/min and purged with nitrogen. The reactor content was heated up to 45° C. 0.05 g V-50 (2,2'-Azobis-(2-amidinopropane) dihydrochloride) were added. After 60 min, temperature was increased up to 50° C. The mixture was polymerised over 72 h at 50° C. and 150/min. The stabiliser was purified and isolated by ultrafiltration and freeze-drying. The weight average molecular weight was about 15.000 g/mole.

Examples 2-7

A polymer dispersion was prepared by polymerising a monomer mixture comprising acrylamide and acrylic acid in the presence of a polymeric stabiliser and a polymeric co-stabiliser.

A mixture of 30 g water, 24.3 g co-stabiliser polyacrylic acid (45%, Sigma-Aldrich, Mw 1,200), 1.2 g stabiliser poly(MAA-co-AMPS) (80:20) copolymer (according to example 1, Mw 15,000), 28.1 g acrylamide (50 wt %), 1.07 g acrylic acid, 0.04 g sodium formiate, 0.03 g EDTA, and 1.17 g NaOH (50 wt %) was stirred and the pH was adjusted to 7. Water was added up to 100 g and during 8 hours azo-initiator VA-044 (4%) (2,2'-azobis-(N,N'-dimethyleneisobutyramidine) dihydrochloride, Wako) was added (0.5 g in steps). The temperature was kept at 35° C. After 16 hours, the stirring was stopped.

Five further polymer dispersions were prepared using the same procedure as described above but changing the ratio non-ionic monomer and anionic monomer, using a second non-ionic monomer in the dispersed polymer, and also using as co-stabiliser in some cases a combination of polyacrylic acid and polymethacrylic acid. As stabiliser 1.2 weight % poly-(MMA-co-AMPS) in a mole ratio of 80:20 was used. The active contents (polymer content) in the stabiliser was around 15 weight %. 11 weight % of co-stabiliser was used.

In Table 1, the following abbreviations are used:
AAm=acrylamide
AA=acrylic acid
MMA=methylmethacrylate
t-BuA=t-butyl acrylate
n-BuA=n-butyl acrylate
PAA=polyacrylic acid
PMAA=polymethacrylic acid

TABLE 1

| Dispersion | anionic monomer | non-ionic monomer | co-stabiliser | stabiliser |
|---|---|---|---|---|
| Example 2 | AA (10 mol-%) | AAm (90 mol-%) | PAA (Mw 1,200) | poly-(MMA-co-AMPS) (Mw 15,000) |
| Example 3 | AA (15 mole-%) | AAm (85 mole-%) | PAA (Mw 1,200) | poly-(MMA-co-AMPS) (Mw 20,000) |
| Example 4 | AA (15 mole-%) | AAm (85 mole-%) | PAA (Mw 1,200) PMAA (Mw 9,500) (1:1 ratio) | poly-(MMA-co-AMPS) (Mw 20,000) |
| Example 5 | MMA (10 mole-%) AA (10 mole-%) | AAm (80 mole-%) | PAA (Mw 1,200) | poly-(MMA-co-AMPS) (Mw 20,000) |
| Example 6 | MMA (10 mole-%) t-BuA (10 mole-%) | AAm (80 mole-%) | PAA (Mw 1,200) | poly-(MMA-co-AMPS) (Mw 20,000) |
| Example 7 | MMA (10 mole-%) n-BuA (10 mole-%) | AAm (80 mole-%) | PAA (Mw 1,200) PMAA (Mw 9,500) (1:1 ratio) | poly-(MMA-co-AMPS) (Mw 20,000) |

The process viscosity was low (lower than ~2000 mPas) for all dispersions.

Example 8

The polymer dispersions prepared in Examples 2-4 were tested for retention and dewatering performance in papermaking processes by means of a Dynamic Drainage Analyser (DDA) available from Akribi, Sweden. The furnish used was based on 60% by weight of bleached 80/20 birch-pine pulp and 40% by weight of calcium carbonate. The stock volume was 800 ml, the pulp concentration 5 g/L and the conductivity 1.5 mS/cm. The stock was stirred at a speed of 1500 rpm while the following was added to the stock: an anionic trash catcher (0.5 kg/t), polymer dispersion (1.0 kg/t) and finally anionic inorganic particles (0.5 kg/t). The temperature was 22.5° C. A vacuum of 0.35 bar was used for the analysis. The retention time (s) and turbidity (NTU) was measured.

TABLE 2

Polymer dispersions and application tests

| Polymer dispersion | Polymer load (kg/t) | Retention time (s) | Turbidity (NTU) |
|---|---|---|---|
| Example 2 | 1.0 | 15.2 | 198 |
| Example 3 | 1.0 | 14.6 | 220 |
| Example 4 | 1.0 | 13.2 | 214 |

It is concluded that the dispersions according to the invention function well in retention and dewatering aids.

Example 9

The shelf life, measured as sedimentation stability, was tested for the dispersions according to Examples 2-7. A 10 g sample of each dispersion was centrifuged for 30 minutes at 3000 rpm. The amount of polymer sediment was determined for each sample. No sample gave any polymer sediment Thus, it is concluded that polymer dispersions with long shelf life can be obtained by the present invention, also at high active contents.

The invention claimed is:
1. Polymer dispersion comprising
a dispersed polymer (A) of one or more water soluble anionic monomers ($m_1$) and one or more non-ionic vinyl monomers ($m_2$),
a polymeric stabiliser (B) which is a polymer of one or more monomers selected from the group consisting of acrylic acid, methacrylic acid, itaconic acid, 2-acrylamido-2-methyl-1-propane sulphonic acid (AMPS), 2-acrylamido-2-methyl-1-butane sulphonic acid (AMBS), acryloyloxyethyl sulphonic acid, methacryloyloxyethyl sulphonic acid, acryloyloxypropyl sulphonic acid, methacryloyloxypropyl sulphonic acid, vinyl sulphonic acid, allyl sulphonic acid, methallyl sulphonic acid, styrene sulphonic acid, maleic acid, maleamidic acid, and vinyl phosphonic acid, or a copolymer of i) maleic acid or maleamidic acid, with ii) styrene or vinyl ethers or alpha-olefins, and
a polymeric co-stabiliser (C) which is a polymer of one or more monomers selected from the group consisting of acrylic acid, methacrylic acid, vinyl sulphonate, styrene sulphonic acid, itaconic acid, vinylphosphonic acid, 2-acrylamido-2-methyl-1-propane sulphonic acid (AMPS), 2-acrylamido-2-methyl-1-butane sulphonic acid (AMBS), acryloyloxyethyl sulphonic acid, methacryloyloxyethyl sulphonic acid, acryloyloxypropyl sulphonic acid, and methacryloyloxypropyl sulphonic acid,
the weight average molecular weight of the polymeric stabiliser (B) is from about 20,000 to about 1,000,000 g/mole and the weight average molecular weight of the polymeric co-stabiliser (C) is from about 1,000 to about 15,000 g/mole,
wherein the polymer dispersion comprises an amount of inorganic salt of from 0 to about 0.5 weight % based on the total weight of the dispersion; and wherein the polymeric stabiliser (B) and the polymeric co-stabiliser (C) are made up from different monomers.

2. Polymer dispersion according to claim 1, wherein two or more co-stabilisers (C) are present in the polymer dispersion.

3. Polymer dispersion according to claim 1, wherein the weight average molecular weight of the polymeric stabiliser (B) is from about 35,000 to about 500,000 g/mole.

4. Polymer dispersion according to claim 1, wherein the anionic monomer ($m_1$) is selected from the group consisting of acrylic acid, methacrylic acid, styrene sulphonic acid, 2-acrylamido-2-methyl-1-propane sulphonic acid (AMPS), 2-acrylamido-2-methyl-1-butane sulphonic acid (AMBS), acryloyloxyethyl sulphonic acid, methacryloyloxyethyl sulphonic acid, acryloyloxypropyl sulphonic acid, methacryloyloxypropyl sulphonic acid, vinyl sulphonic acid, and their alkali, alkaline earth or ammonium salts.

5. Polymer dispersion according to claim 1, wherein the one or more non-ionic monomers ($m_2$) are selected from the group consisting of acrylamide, methacrylamide, N-methylacrylamide, N-methylmethacrylamide, N-ethylacrylamide, N-ethylmethacrylamide, N-isopropylacrylamide, N-isopropylmethacrylamide, N,N-dimethylacrylamide, N-t-butylacrylamide, N-t-butylmethacrylamide, N-hydroxyethylacrylamide, N-(tris-(hydroxymethyl)-methyl)-acrylamide, N-vinyl formamide, N-vinyl acetamide, hydroxyalkylacrylate or hydroxyalkylmethacrylate with C2-C4 alkyl, alkylacrylate or alkylmethacrylate with C1-C4 alkyl, benzylacrylate, benzylmethacrylate, esters of acrylic or methacrylic acid with dihydroxy-(polyethylene oxide) having 1-20 ethylene oxide units, and esters of acrylic or methacrylic acid with monomethoxyhydroxy-(polyethylene oxide) having 1-20 ethylene oxide units.

6. Polymer dispersion according to claim 1, wherein the one or more monomers ($m_2$) are selected from the group consisting of acrylamide, acrylate or methacrylate esters.

7. Polymer dispersion according to claim 1, comprising from about 10 to about 30 weight % of the dispersed polymer (A).

8. Polymer dispersion according to claim 1, comprising from about 0.5 to about 3 weight % of the polymeric stabiliser (B).

9. Polymer dispersion according to claim 1, comprising from about 3 to about 25 weight % of the polymeric co-stabiliser (C).

10. Polymer dispersion according to claim 3, wherein the weight average molecular weight of the polymeric co-stabiliser (C) is from about 1,000 to about 10,000 g/mole.

11. Polymer dispersion according to claim 10, wherein the amount of inorganic salt is from 0 to about 0.1 weight % based on the total weight of the dispersion.

12. Polymer dispersion according to claim 11, wherein the dispersion comprises from about 0.8 to about 1.5 wt % of the polymeric stabiliser (B) and from about 5 to about 15 wt % of the polymeric co-stabiliser (C).

13. Process for preparing a polymer dispersion according to claim 1, the process comprising polymerising one or more water soluble anionic monomers ($m_1$) and one or more non-ionic vinyl monomers ($m_2$) present in a reaction mixture further comprising a polymeric stabiliser (B) and a polymeric co-stabiliser (C), wherein the polymeric stabiliser (B) is a polymer of one or more monomers are selected from the group consisting of acrylic acid, methacrylic acid, itaconic acid, 2-acrylamido-2-methyl-1-propane sulphonic acid (AMPS), 2-acrylamido-2-methyl-1-butane sulphonic acid (AMBS), acryloyloxyethyl sulphonic acid, methacryloyloxyethyl sulphonic acid, acryloyloxypropyl sulphonic acid, methacryloyloxypropyl sulphonic acid, vinyl sulphonic acid, allyl sulphonic acid, methallyl sulphonic acid, styrene sulphonic acid, maleic acid, maleamidic acid, and vinyl phosphonic acid or a copolymer of i) maleic acid or maleamidic acid, with ii) styrene or vinyl ethers or alpha-olefins;

wherein the polymeric co-stabiliser (C) is a polymer of one or more monomers are selected from the group consisting of acrylic acid, methacrylic acid, vinyl sulphonate, styrene sulphonic acid, itaconic acid, vinylphosphonic acid, 2-acrylamido-2-methyl-1-propane sulphonic acid (AMPS), 2-acrylamido-2-methyl-1-butane sulphonic acid (AMBS), acryloyloxyethyl sulphonic acid, methacryloyloxyethyl sulphonic acid, acryloyloxypropyl sulphonic acid, and methacryloyloxypropyl sulphonic acid; wherein the weight average molecular weight of the polymeric stabiliser (B) is from about 20,000 to about 1,000,000 g/mole and the weight average molecular weight of the polymeric co-stabilizer (C) is from about 1,000 to about 15,000 g/mole; wherein the polymeric stabiliser (B) and the polymeric co-stabiliser (C) are made up from different monomers; and wherein the reaction mixture comprises an amount of inorganic salt of from 0 to about 0.5 wt % based on the total weight of the reaction mixture.

14. Process according to claim 1, wherein two or more co-stabilisers (C) are present in the reaction mixture.

15. Process according to claim 1, wherein the polymeric stabiliser (B) is a copolymer of maleic acid or maleamidic acid, respectively, with styrene or vinyl ethers, or alpha-olefins.

16. Process according to claim 1, wherein the weight average molecular weight of the polymeric stabiliser (B) is from about 35,000 to about 500,000 g/mole.

17. Process according to claim 1, wherein the anionic monomer ($m_1$) is selected from the group consisting of acrylic acid, methacrylic acid, styrene sulphonic acid, 2-acrylamido-2-methyl-1-propane sulphonic acid (AMPS), 2-acrylamido-2-methyl-1-butane sulphonic acid (AMBS), acryloyloxyethyl sulphonic acid, methacryloyloxyethyl sulphonic acid, acryloyloxypropyl sulphonic acid, methacryloyloxypropyl sulphonic acid, vinyl sulphonic acid, and their alkali, earth alkali or ammonium salts.

18. Process according to claim 1, wherein the one or more non-ionic monomers ($m_2$) are selected from the group consisting of acrylamide, methacrylamide, N-methylacrylamide, N-methylmethacrylamide, N-ethylacrylamide, N-ethylmethacrylamide, N-isopropylacrylamide, N-isopropylmethacrylamide, N,N-dimethylacrylamide, N-t-butylacrylamide, N-t-butylmethacrylamide, N-hydroxyethylacrylamide, N-(tris-(hydroxymethyl)-methyl)-acrylamide, N-vinyl formamide, N-vinyl acetamide, hydroxyalkylacrylate or hydroxyalkylmethacrylate with C2-C4 alkyl, alkylacrylate or alkylmethacrylate with C1-C4 alkyl, benzylacrylate, benzylmethacrylate, esters of acrylic or methacrylic acid with dihydroxy-(polyethylene oxide) having 1-20 ethylene oxide units, and esters of acrylic or methacrylic acid with monomethoxyhydroxy-(polyethylene oxide) having 1-20 ethylene oxide units.

19. Process according to claim 1, wherein the one or more monomers ($m_2$) are selected from the group consisting of acrylamide, acrylate or methacrylate esters.

20. Process according to claim 1, wherein the reaction mixture comprises from about 3 to about 20 mol % of the one or more water soluble anionic monomers ($m_1$).

21. Process according to claim 1, wherein the reaction mixture comprises from about 80 to about 97 mol % of the one or more non-ionic vinyl monomers ($m_2$).

22. Process according to claim 1, wherein the reaction mixture comprises from about 0.5 to about 3 weight % of the polymeric stabiliser (B).

23. Process according to claim 1, wherein the reaction mixture comprises from about 3 to about 25 weight % of the polymeric co-stabiliser (C).

24. Process for the production of paper from an aqueous suspension containing cellulosic fibres, and optional fillers, which comprises adding to the suspension a polymer dispersion according to claim 1, forming and draining the suspension on a wire.

* * * * *